Dec. 3, 1963    A. HASBROUCK ETAL    3,112,702
MISSILE INTERSTAGE SEPARATING DEVICE
Filed June 1, 1960
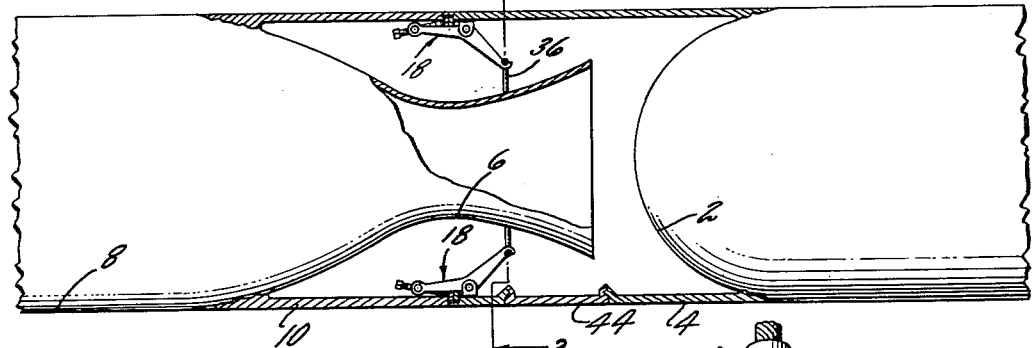
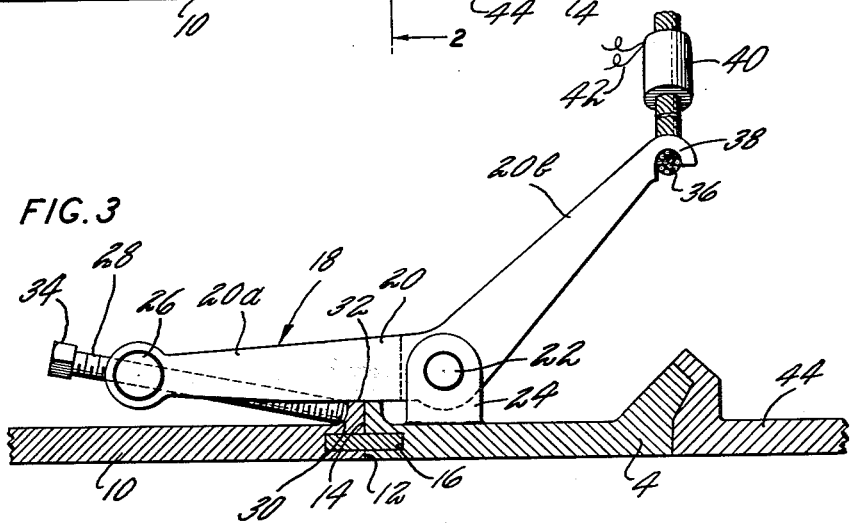
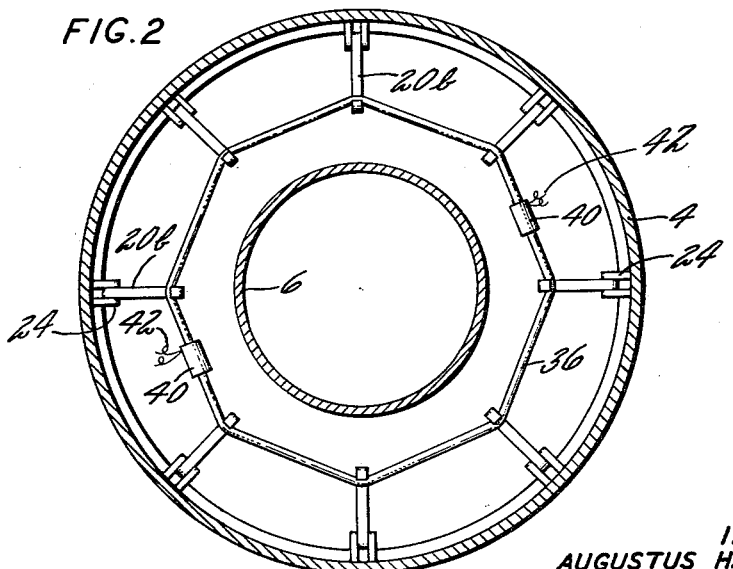
INVENTORS
AUGUSTUS HASBROUCK
WALTER A. LEDWITH
BY  Charles G. Warren
ATTORNEY 3,112,702
MISSILE INTERSTAGE SEPARATING DEVICE
Augustus Hasbrouck, Middletown, and Walter A. Ledwith, Glastonbury, Conn., assignors to United Aircraft Corporation, East Hartford, Conn., a corporation of Delaware
Filed June 1, 1960, Ser. No. 33,255
9 Claims. (Cl. 102—49)

The present invention relates to a device for holding adjacent stages of a multi-stage rocket together such that they may be released when separation is desired.

One feature of the present invention is an arrangement by which a single element holds the several locking devices in locking position, such that release of the single element releases the several locking devices. Another feature is an arrangement which provides a plurality of attachment points around the periphery of the vehicle all of which are released simultaneously by a single holding member.

One feature of the invention is the incorporation of a toggle linkage at the attachment point between the successive vehicle stages thereby assuring a secure attachment of the stages together without excessively loading the attachment means. Another feature is the incorporation of an adjustable link in the attachment device.

Other features and advantages will be apparent from the specification and claims, and from the accompanying drawing which illustrates an embodiment of the invention.

FIG. 1 is a fragmentary longitudinal sectional view through a portion of a multi-stage rocket showing the invention.

FIG. 2 is a sectional view substantially along the line 2—2 of FIG. 1.

FIG. 3 is an enlarged longitudinal section view showing one of the locking means in greater detail.

The invention is shown as applied to a multi-stage rocket in which the first stage is represented by the head 2 of the combustion chamber. The first stage carries a substantially cylindrical sleeve 4 projecting forwardly and surrounding the nozzle 6 of the second stage rocket or vehicle 8. The second stage rocket 8 carries a rearwardly projecting sleeve 10 engaging endwise with the sleeve 4 to hold the stages of the rocket in axial spaced relation and these sleeves have cooperating radial surfaces 12 and 14 which interengage and which transmit the thrust of the first stage rocket to the remainder of the vehicle which may include a second stage rocket and/or vehicle elements mounted thereon. These surfaces may be held in alignment by one or more dowel pins 16 (FIG. 3) if desired.

The sleeves 4 and 10 are held together axially by a plurality of toggle linkages 18. Each linkage includes a bellcrank lever 20 pivoted on a pin 22 on a bracket 24 on the sleeve 4, the bellcrank lever having one arm 20a extending forwardly and the other arm 20b extending rearwardly. The forward end of the arm 20a is bifurcated and carries a transversely extending pin 26 through which a stud 28 projects. The rearward end of the stud 28 is in a position to engage a notch 30 provided between the end of the sleeve 10 and an inwardly projecting flange 32 on the sleeve 10. The other end of the stud may have a square or other flat sided head 34 for purpose of adjustment. The stud 28 is in effect an arm or link pivoted on the pin 26.

The arm 20a of the bellcrank lever and the stud or link 28 together constitute a toggle linkage which is so arranged that when the parts are in the locking position shown, the arm 20a and the link or stud 28 are both substantially parallel to the axis of the sleeves 4 and 10 and the toggle is nearly at "dead center" position. The flange 32 limits counterclockwise movement of the lever 18 beyond the position shown. The several toggle linkages are held in locking position by a cable 36 which extends around the downstream ends of the arms 20b being received in notches 38 therein. It will be apparent that with the parts in the arrangement shown, a relatively small tension in the cable 36 will hold the toggle linkages in locking position.

One or more explosive connectors 40 may be incorporated in the cable 36 so that when separation of the first stage rocket is desired, the connector may be severed as by an electrical impulse supplied to the connector through the power wires 42. When the cable is severed the toggle linkages, not being on "dead center," and the bellcrank lever 20 will turn clockwise (FIG. 3) and the studs or links 28 will no longer function to hold the successive stages in contact with one another. The rocket stages will be blown apart by pressure from the second stage nozzle 6 when the second stage rocket is ignited. Ignition of the second stage may be simultaneous with the explosion of link 40, if desired. With a plurality of connectors 40 separation will be assured even if one of the connectors should fail to go off.

It will be understood that a suitable manhole 44 may be provided in the sleeve 4 for access to the toggle linkages in assembling the rocket stages.

It is to be understood that the invention is not limited to the specific embodiment herein illustrated and described but may be used in other ways without departure from its spirit as defined by the following claims.

We claim:
1. Locking means for holding a vehicle and a rocket stage in assembled relation, said vehicle and stage having cooperating rings thereon, said rings having end surfaces thereon in endwise engagement to hold said vehicle and stage in predetermined axial relation, said locking means including a plurality of levers each pivoted between its ends on one of said rings, said levers being located internally of the rings, each lever having at one end a link pivoted thereon and engaging with the other ring, and means extending between and engaging the opposite ends of said plurality of levers for urging said levers and the links thereon into operative position said means being located internally of said rings and surrounding said opposite ends of said levers.

2. Locking means as in claim 1 in which the link is longitudinally adjustable in the end of the lever on which it is pivoted.

3. Locking means as in claim 1 in which each lever and the cooperating link pivoted thereon constitutes a toggle device which approaches dead center in the operative position.

4. Locking means as in claim 1 in which said other ring has a flange thereon for engagement by the ends of said links.

5. Locking means as in claim 1 in which each lever has a portion extending forwardly from the pivot and in which the link is pivoted adjacent to the end of said forwardly extending portion and extends in a rearwardly direction with the rearward end of the link engaging said other ring, such that in locking position the link and the forwardly extending portion of the lever are in substantially parallel relation.

6. Locking means for holding a vehicle and a rocket stage in assembled relation, said vehicle and said stage having cooperating sleeves thereon in endwise engagement to hold said vehicle and stage in predetermined axial relation, one of said sleeves having an annular flange on the inner surface thereof, said locking means including a plurality of levers pivotally mounted on and arranged in a ring on the inner surface of the other sleeve, each lever having means thereon at one end for engaging said annular flange to hold said sleeves together and releasable holding means in the form of a cable extending around and engaging all of said levers at the other ends thereof to hold the flange engaging means in operative position.

7. Locking means for holding a vehicle and a rocket stage in assembled relation, said vehicle and said stage having cooperating sleeves thereon in endwise engagement to hold said vehicle and stage in predetermined axial relation, one of said sleeves having an annular flange on the inner surface thereof, said locking means including a plurality of levers each pivotally mounted between its ends on the other sleeve, said levers being arranged in a ring on the inner surface of the other sleeve, each lever in locking position extending in part substantially parallel to the axis of the sleeve and an adjustable link pivoted on the lever at a point remote from the pivotal mounting, said link extending in locking position substantially parallel to the axis of the sleeves such that the link and the part of each lever substantially parallel to the axis of the sleeve constitute a toggle, the end of the link remote from its pivot point on the lever engaging with said flange.

8. Locking means for holding a vehicle and a rocket stage in assembled relation, said vehicle and said stage having cooperating sleeves thereon in endwise engagement to hold said vehicle and stage in predetermined axial relation, one of said sleeves having an annular flange thereon adjacent to the end thereof, said locking means including a plurality of bellcrank levers arranged in a ring inside the other sleeve, each lever being pivoted on a transverse axis substantially tangential to said other sleeve, one end of each lever extending toward and into said one sleeve, and an adjustable link pivotally mounted on said one end of each lever and extending from its pivot point toward said other sleeve, the free end of said link engaging with said flange to urge said one sleeve into engagement with the end of said other sleeve, each lever having its opposite end extending in an axial direction away from said link, and means interconnecting said opposite ends of said levers and urging said opposite ends toward the axis of the sleeves.

9. Locking means as in claim 8 in which said means is a cable extending around the ends of the levers and with an explosive connector therein.

References Cited in the file of this patent

UNITED STATES PATENTS

| | | |
|---|---|---|
| 455,202 | Hampton | June 30, 1891 |
| 2,421,178 | Baker et al. | Dec. 9, 1944 |
| 2,495,754 | Nance | Jan. 31, 1950 |
| 2,790,409 | Cain | Apr. 30, 1957 |
| 2,996,985 | Kratzer | Aug. 22, 1961 |

FOREIGN PATENTS

| | | |
|---|---|---|
| 163,777 | Australia | July 1, 1955 |